United States Patent [19]

Stange et al.

[11] 4,171,131

[45] * Oct. 16, 1979

[54] PNEUMATIC REGISTRATION APPARATUS

[75] Inventors: Klaus K. Stange, Pittsford; Richard E. Smith, Webster; Thomas J. Hamlin, Macedon; James R. Cassano, Penfield, all of N.Y.

[73] Assignee: Xerox Corporation, Stamford, Conn.

[ * ] Notice: The portion of the term of this patent subsequent to Jan. 3, 1995, has been disclaimed.

[21] Appl. No.: 860,009

[22] Filed: Dec. 12, 1977

Related U.S. Application Data

[63] Continuation of Ser. No. 627,642, Oct. 31, 1975, abandoned.

[51] Int. Cl.$^2$ ............................................. B65H 9/00
[52] U.S. Cl. ........................................ 271/236; 271/195
[58] Field of Search ............. 271/194, 195, 211, 226, 271/229, 231, 234, 236, 250, 251, 264

[56] References Cited

U.S. PATENT DOCUMENTS

| | | | |
|---|---|---|---|
| 1,107,859 | 8/1914 | Stevens | 271/211 |
| 1,947,211 | 2/1934 | McFarlane | 271/264 |
| 3,173,683 | 3/1965 | Tebbs | 271/231 |
| 3,405,977 | 10/1968 | Albright | 271/195 |
| 3,422,411 | 1/1969 | Smith, Jr. | 271/3 X |
| 3,588,176 | 6/1971 | Byrne et al. | 302/2 |
| 3,624,807 | 11/1971 | Schwebel | 271/236 |
| 3,731,823 | 5/1973 | Goth | 214/6 F |
| 3,784,189 | 1/1974 | Thiel | 271/264 |
| 3,834,799 | 9/1974 | Blosser et al. | 353/27 |
| 3,918,706 | 11/1975 | Craft | 271/250 |
| 4,066,254 | 1/1978 | Stange et al. | 271/195 X |

Primary Examiner—Robert W. Saifer

[57] ABSTRACT

In a first embodiment a stop having a plurality of ports is connected to and covers an end of a rectangular sleeve. In a region near the stop a narrow wall of the sleeve also has a plurality of ports. A nozzle coupled to a pump provides a flow of air into the other end of the sleeve and the air exits through the ports. With this arrangement, a rectangular sheet inserted into said other end of the sleeve is fluidly brought into registration with the narrow wall and stop. As the sheet is brought into registration fluid injected or drawn through holes in a wide wall of the sleeve is used to force at least a part of the sheet against one of the wide walls and the resulting friction serves to brake the traveling sheet, thereby minimizing impact forces between the sheet, the narrow wall, and the stop. In a second embodiment, similar to the first, the narrow wall and stop include internal projections against which an inserted sheet is registered. In a third embodiment, similar to the first, a manifold is coupled to the ports and a vacuum pump is coupled to the manifold to accelerate registration. In a fourth embodiment, similar to the third, the pumps are replaced with a reversible pump to register and discharge a sheet.

1 Claim, 7 Drawing Figures

PNEUMATIC REGISTRATION APPARATUS

This is a continuation, of application Ser. No. 627,642, filed Oct. 31, 1975, now abandoned.

The subject invention generally relates to pneumatic transports and, in particular, to transports used to register articles carried thereby.

The use of fluid to move articles into registration with stops is a part of the prior art which is relevant herein. In fact, such use of fluids is disclosed in U.S. Pat. No. 3,588,096, issued to Leigh D. Leiter on June 28, 1971. More particularly, the patent discloses apparatus wherein fabric is delivered to a horizontally disposed support including recessed areas housing upwardly pointed nozzles. The nozzles are aligned in two different directions, and the nozzles pointing in one direction are alternately actuated with respect to the nozzles pointing in the other direction to move the fabric into registration in perpendicular directions. Further, the use of fluids for rectilinearly moving an article within a conduit or chamber is also known. In fact, this concept is disclosed in U.S. Pat. No. 3,422,411, issued to J. E. Smith, Jr., on Jan. 14, 1969. More specifically, this patent discloses a data storage cartridge which has an enclosed transfer chamber housing a data storage card. Air pressure and vacuum pressure are switched between opposite ends of the chamber to reciprocally move the card rectilinearly in the chamber. As is disclosed in U.S. Pat. No. 3,588,176, issued to T. M. Byrne on June 28, 1971, the use of a vacuum brake to stop an article moving through an enclosed duct is known.

It is noted that with the apparatus disclosed by Leigh D. Leiter, as fabric is advanced or when fabric which is smaller than the distance between nozzles is to be registered, some of the nozzles discharge into the surrounding air without having any effect on the fabric as it is moved into registration. Thus, pressurized air is wasted. In addition, it is noted that in the system disclosed by J. E. Smith, Jr., lateral registration is provided by the distance between walls of the chamber which are parallel to the direction of travel of the storage card. Thus, the system cannot be used with cards having different width dimensions. It is noted that, in the prior art set forth, the use of fluid to create a normal force for friction braking an article as it is registered is not disclosed.

It is an object of the present invention to provide apparatus for rapidly but gently registering a sheet with respect to perpendicularly related axes, the sheet having any one of a range of sizes.

It is another object of the present invention to provide apparatus for efficiently moving a sheet into registration with perpendicularly related axes.

Briefly, the invention disclosed herein may be used for registering a sheet with respect to perpendicularly related axes, so long as the sheet has length and width dimensions within predetermined ranges. Structurally, the invention may be implemented with (a) a sleeve for internally accommodating said sheet, at least one point on an inner narrow wall of the sleeve being aligned in parallel with one of the axes; (b) a stop located at one end of the sleeve, the stop having at least one point aligned in parallel with the other of the axes; (c) means for providing in the sleeve a fluid stream having velocity components normal to each of the axes, whereby when a sheet is placed in the sleeve, the stream moves the sheet into abutment with each of said points; and (d) fluidic brake means for uriving at least part of a sheet in the sleeve into frictional engagement with the sleeve as it is moved into registration, thereby reducing impact forces as the sheet is registered.

Apparatus built according to the invention may be used to register flimsy sheets, such as thin paper. Advantageously, loose particles undesirably located on either side of the sheets are removed from the sheets during transportation.

Additional objects and features of the invention will become apparent by reference to the following description in conjunction with the accompanying drawings, in which.

Figures 1, 2, 3, 4:
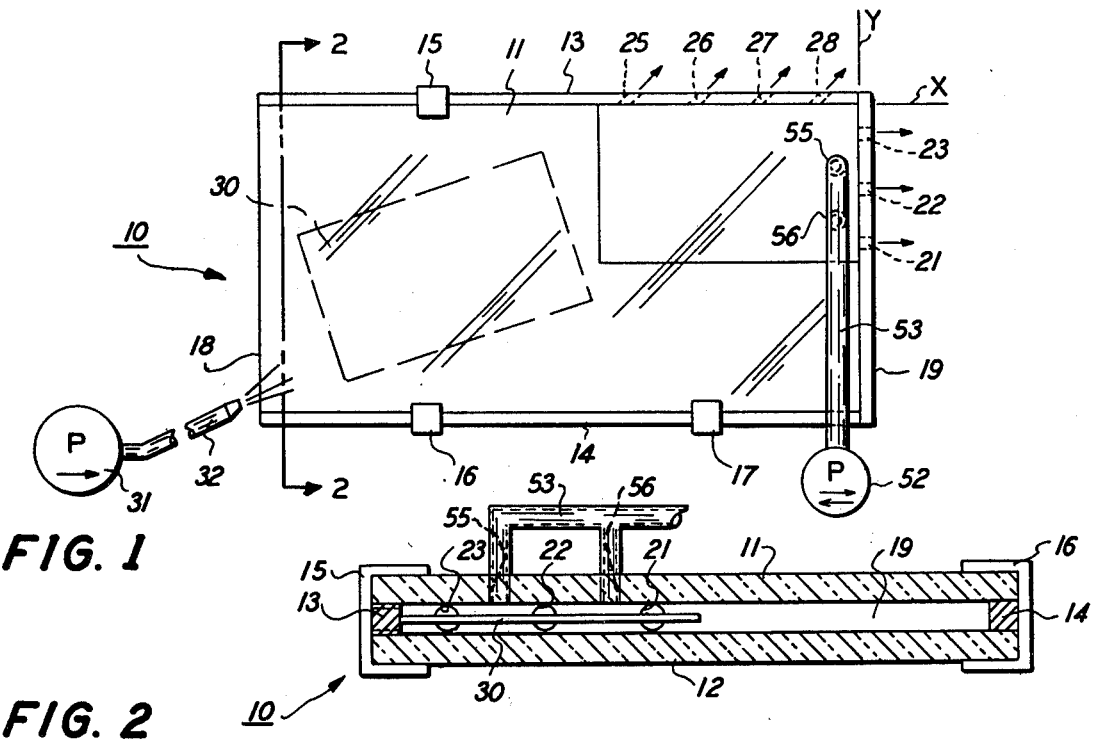
FIG. 1 is a top plan view of registration apparatus, according to the invention, a sheet being shown therein an unregistered position (dotted lines) and in a registered position.
FIG. 2 is a cross-sectional view of the registration apparatus, taken along line 2—2 in FIG. 1.
FIG. 3 is a top plan view of another embodiment of registration apparatus, according to the invention, a sheet being shown therein in an unregistered position (dotted line) and in a registered position.
FIG. 4 is a top plan view of still another embodiment of registration apparatus, according to the invention, a sheet being shown therein in a registered position.

Registration apparatus 10, according to the invention, is shown in FIGS. 1 and 2. Typically, the apparatus includes a pair of structurally identical rectangular plates 11 and 12, a pair of elongated rectangular members 13 and 14 disposed between the plates along longitudinally extending edges, and clamps 15–17 for holding the plates and elongated members together to form a rectangular sleeve. The plates are vertically aligned, and the elongated members are coterminous with the plates at one end 18 and at the other end provide a pair of recesses into which a stop 19 is inserted and secured. The stop 19 includes a plurality of ports 21–23 communicating with the space in the sleeve. Elongated member 13 also includes a plurality of ports 25–28 communicating with the space in the sleeve, the ports in the stop and sleeve being located adjacent a common corner. The plates, the elongated members, and the stop are assembled in a fluid tight manner, such that fluid entering through the open end of the sleeve moves towards the common corner and exits through the ports. The stop is perpendicularly disposed with regard to the elongated members and, therefore, the common corner may be aligned with X and Y axes. The top and bottom plates are spaced from each other by approximately one-sixteenth of an inch, and a sheet of paper 30 which is smaller than the length and width of the space in the sleeve may be inserted therein as is indicated by the dotted lines. If, thereafter, a pump 31 and nozzle 32 direct fluid into the open end of the sleeve, the fluid flow through the sleeve will move the sheet into registration at the common corner. As the sheet 30 moves into registration, a pump 52 coupled to a conduit 53 provides through holes 55 and 56 in plate 11 jets of air forcing the sheet into frictional engagement with plate 12 or a vacuum pressure which forces the sheet into frictional engagement with plate 11. The frictional engagement slows down the sheet prior to registration and minimizes impact forces thereon. Although not shown, sensors may be used to detect a sheet moving toward the common corner and signals from the sensors may be used to control the on time of the pump 52. To move the sheet out of registration, the horizontally disposed sleeve may be tilted or a fluid stream may be injected into the sleeve through one or more of the ports in the stop 19. Preferably, when the sheet is being removed, pump 52 is turned off. In this embodiment, the top and bottom plates are manufactured from glass. Thus, sheets brought into registration may be read, may be photographed, or may be scanned with equipment at least from the side which is not coupled to the fluidic braking apparatus.

The registration apparatus disclosed above may be modified or supplemental in a number of ways, some of which are set forth below. In describing the various embodiments similar reference numerals will be used to designate components previously described.

Referring to FIGS. 1 and 3, it may be seen that the registration apparatus shown in FIG. 3 differs from that shown in FIG. 1 only in that ports 34 and 35 communicating with the sleeve are located on the elongated member 14 in an area adjacent the open end of the sleeve and that an additional nozzle 33 has been coupled to the pump. The nozzles are used to inject fluid through the ports in the elongated member for moving a sheet 30 inserted into the sleeve into a registered position. Although not shown, it will be appreciated by those skilled in the art that the nozzles may be replaced by a manifold coupling the pump to ports in elongated member 14. Further, a removable cover for closing the open end 18 after a sheet has been inserted may be provided to increase the speed with which a sheet is moved into registration. Primarily, this embodiment has been disclosed to make it clear that fluid for registering a sheet located in the sleeve need not be supplied through the open end of the sleeve.

Figure 5:
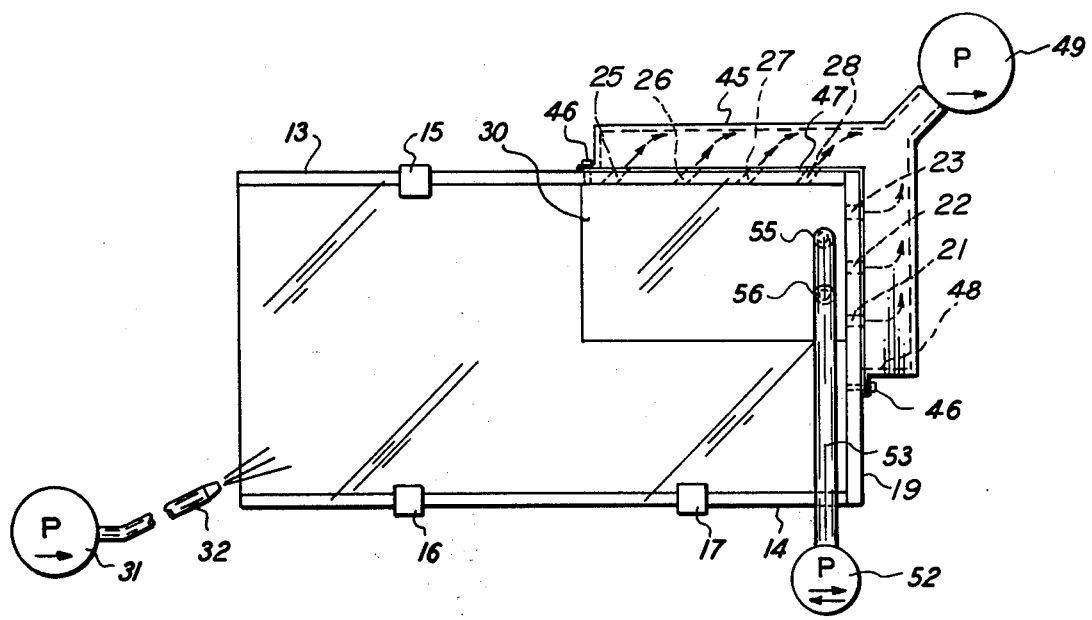
FIG. 5 is a top plan view of still another embodiment of registration apparatus, according to the invention, a sheet being shown therein in a registered position.
Figure 6:
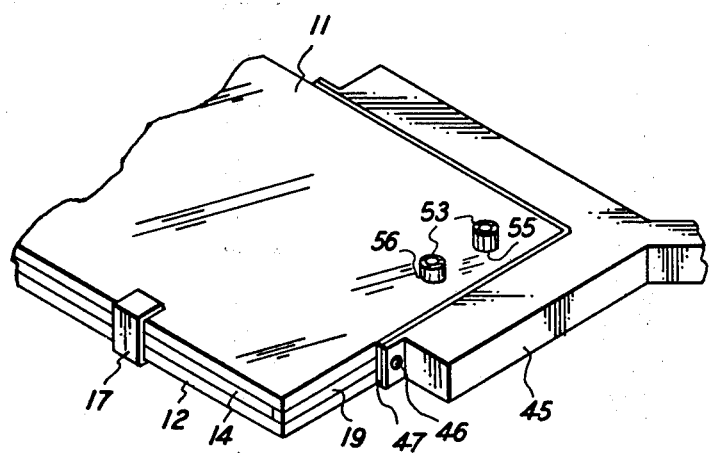
FIG. 6 is a partial perspective view of the registration apparatus shown in FIG. 5.

Referring to FIGS. 1 and 4, it may be seen that the registration apparatus shown in FIG. 4 differs from that shown in FIG. 1 only in that elongated member 13 includes projections 40 and 41 tangentially aligned with an X axis, and the stop member includes a projection 42 tangentially aligned with a Y axis. These projections minimize the need for precise orthogonal alignment between the stop 19 and the elongated member 13 required to register a rectangular sheet. Alternatively, the projections improve registration when minor irregularities are present in sheets supplied for registration. Referring to FIGS. 1, 5, and 6, it may be seen that the registration apparatus disclosed in FIGS. 5 and 6 differ from that shown in FIG. 1 in that a manifold 45 is fastened with screws 46 to the elongated member 13 and stop 19. A gasket 47 is interposed between the manifold 45 and the sleeve to prevent fluid leakage. The ports 25-28 in the elongated member and ports 21-23 in the stop communicate with a chamber 48 in the manifold, and the chamber in the manifold communicates with a vacuum pump 49. With this arrangement, the flow of fluid through the sleeve may be accelerated to more rapidly register sheets inserted through the open end of the sleeve. If desired, the pump 31 and nozzle 32 may be dispensed with, and the sheet may be registered with the vacuum pump 49. Thus, it may be seen that sheet 30 may be registered with a pressure pump, with a vacuum pump, or with both. In a laboratory experiment, apparatus similar to that which is shown in FIG. 5 was assembled, the chamber defined by the sleeve and stop having dimensions of 9×15×0.75 inches. With an 8.5×14 inch 20 lb. sheet of paper inserted almost entirely in the chamber negative pressures of 1 and 4 inches of water at the manifold exerted forces of 4 and 12 grams, respectively, on the sheet.

Figure 7:
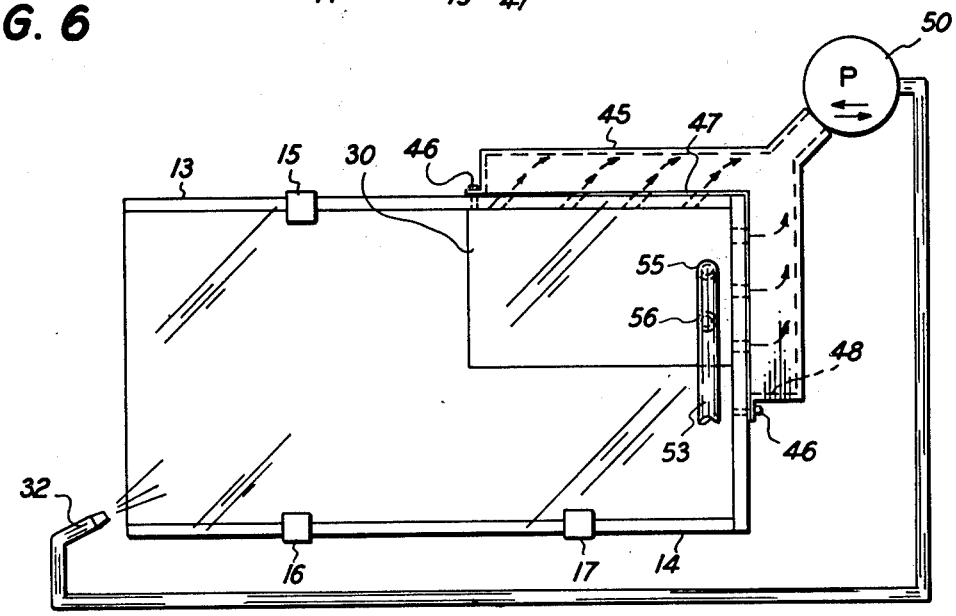
FIG. 7 is a top plan view of yet another embodiment of registration apparatus, according to the invention, a sheet being shown therein a registered position.

Referring to FIGS. 5 and 7, it may be seen that FIG. 7 shows apparatus which differs from that which is shown in FIG. 5 only in that the pumps 31 and 49 have been replaced with a reversible pump 50 coupled to the nozzle 32 and manifold 45. The reversible pump may be used to rapidly move a sheet inserted into the sleeve into registration and to rapidly move a registered sheet out through the open end of the sleeve. In this connection, it should be appreciated that the term reversible pump may include apparatus having a valve arrangement which may be operated manually or automatically.

It is to be understood that the description herein of preferred embodiments, according to the invention, have been set forth as examples thereof and are not to be construed or interpreted as limitations on the claims which follow and define the invention.

What is claimed is:

1. Apparatus for fluidicly registering a flimsy sheet such as thin paper with respect to perpendicularly related axes for copying, the sheet having a length and width within predetermined ranges, comprising:
   (a) a sleeve larger than the sheet for internally accommodating said sheet, at least one registration point on an inner narrow wall of the sleeve being coincident with one of the axes;
   (b) a registration stop located adjacent one end of the sleeve, the stop having at least one point coincident with the other of the axes;
   (c) wherein said sleeve includes a top plate and a spaced apart bottom plate with at least said bottom plate being transparent and providing an unobstructed copying area for a sheet registered in said sleeve;
   (d) means for providing in the sleeve a fluid stream, including at least a port in said stop and at least a port in said narrow wall to cause said fluid stream to have velocity components normal to each of said axes, whereby when a sheet is placed in the sleeve the stream moves the sheet into abutment with each of said points; and
   (e) fluidic brake means coupled to said top plate for driving at least a part of a sheet in the sleeve into frictional engagement with one of said top and bottom plates of the sleeve as the sheet is moved into said registration abutment with said points, thereby reducing impact forces as the sheet is registered;
   (f) wherein said fluidic brake means includes at least one hole in said top plate, and means for pumping fluid through said at least one hole to provide jets of air forcing the sheet into frictional engagement with one of said top and bottom plates as the sheet moves into said registration;
   whereby the sheet may be copied from said transparent bottom plate side, which is not coupled to said fluidic brake means.

* * * * *